United States Patent
Bhamri et al.

(10) Patent No.: US 12,531,610 B2
(45) Date of Patent: Jan. 20, 2026

(54) TRANSMISSION SKIPPING BASED ON A BEAM CORRESPONDENCE

(71) Applicant: Lenovo (Singapore) PTE. LTD., New Tech Park (SG)

(72) Inventors: Ankit Bhamri, Rödermark (DE); Hyejung Jung, Northbrook, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 489 days.

(21) Appl. No.: 17/760,229

(22) PCT Filed: Feb. 2, 2021

(86) PCT No.: PCT/IB2021/050843
§ 371 (c)(1),
(2) Date: Aug. 5, 2022

(87) PCT Pub. No.: WO2021/156750
PCT Pub. Date: Aug. 12, 2021

(65) Prior Publication Data
US 2023/0022915 A1 Jan. 26, 2023

Related U.S. Application Data

(60) Provisional application No. 62/970,510, filed on Feb. 5, 2020.

(51) Int. Cl.
*H04B 7/06* (2006.01)
*H04B 7/0408* (2017.01)
*H04B 17/318* (2015.01)

(52) U.S. Cl.
CPC ......... *H04B 7/0617* (2013.01); *H04B 7/0408* (2013.01); *H04B 7/06966* (2023.05); *H04B 17/318* (2015.01)

(58) Field of Classification Search
CPC .. H04B 7/0617; H04B 7/0408; H04B 17/318; H04B 7/0404; H04B 7/0695
See application file for complete search history.

(56) References Cited

U.S. PATENT DOCUMENTS

| | | | |
|---|---|---|---|
| 2017/0289995 A1* | 10/2017 | Lin | H04W 72/23 |
| 2018/0103433 A1* | 4/2018 | Li | H04W 52/146 |
| 2019/0081686 A1* | 3/2019 | Wang | H04B 7/088 |
| 2019/0182855 A1* | 6/2019 | Babaei | H04W 72/1268 |
| 2019/0379506 A1* | 12/2019 | Cheng | H04W 88/06 |

(Continued)

FOREIGN PATENT DOCUMENTS

WO 2019032882 A1 2/2019

OTHER PUBLICATIONS

CATT, Feedback for SPS PDCCH command, 3GPP TSG RAN WG2 Meeting #92, R2-156256 (Year: 2015).*

(Continued)

*Primary Examiner* — Ayaz R Sheikh
*Assistant Examiner* — Mang Boi Thawng
(74) *Attorney, Agent, or Firm* — Kunzler Bean & Adamson

(57) ABSTRACT

Apparatuses, methods, and systems are disclosed for transmission skipping based on a beam correspondence. One method (400) includes receiving (402) information corresponding to skipping uplink transmissions on at least one beam, at least one panel, or a combination thereof. The method (400) includes determining (404) whether a downlink transmission beam is blocked, a signal strength corresponding to the downlink transmission beam is less than a threshold signal strength, or a combination thereof. The method (400) includes, in response to the downlink transmission beam being blocked, the signal strength corresponding to the downlink transmission beam being less than the threshold signal strength, or a combination thereof, skipping (406) one or more uplink transmissions on the at least one beam, the at least one panel, or the combination thereof that (Continued)

corresponds to the downlink transmission beam based on the information corresponding to skipping uplink transmissions.

20 Claims, 4 Drawing Sheets

(56) References Cited

U.S. PATENT DOCUMENTS

2021/0235307 A1* 7/2021 Venugopal ........... H04B 7/0617
2022/0322480 A1* 10/2022 Deenoo ................ H04W 72/23

OTHER PUBLICATIONS

PCT/IB2021/050843, "Notification of Transmittal of the International Search Report and the Written Opinion of the International Searching Authority, or the Declaration", International Searching Authority, Apr. 9, 2021, pp. 1-14.

Intel Corp., "New SID: Study on supporting NR from 52.6GHz to 71 GHz", 3GPP TSG RAN Meeting #86 RP-193259, Dec. 9-12, 2019, pp. 1-3.

3GPP, "3rd Generation Partnership Project; Technical Specification Group Radio Access Network; NR; Physical channels and modulation (Release 17)", 3GPP TS 38.211 V17.2.0, Jun. 2022, pp. 1-136.

3GPP, "3rd Generation Partnership Project; Technical Specification Group Radio Access Network; NR; Physical layer procedures for control (Release 17)", 3GPP TS 38.213 V17.2.0, Jun. 2022, pp. 1-256.

3GPP, "3rd Generation Partnership Project; Technical Specification Group Radio Access Network; NR; Physical layer procedures for data (Release 16)", 3GPP TS 38.214 V16.10.0, Jun. 2022, pp. 1-174.

* cited by examiner

TRANSMISSION SKIPPING BASED ON A BEAM CORRESPONDENCE

CROSS-REFERENCE TO RELATED APPLICATIONS

This application claims priority to U.S. Patent Application Ser. No. 62/970,510 entitled "APPARATUSES, METHODS, AND SYSTEMS FOR SKIPPING TRANSMISSIONS ON DEFAULT UL BEAMS CORRESPONDING TO BLOCKED DL BEAMS" and filed on Feb. 5, 2020 for Ankit Bhamri, which is incorporated herein by reference in its entirety.

FIELD

The subject matter disclosed herein relates generally to wireless communications and more particularly relates to transmission skipping based on a beam correspondence.

BACKGROUND

The following abbreviations are herewith defined, at least some of which are referred to within the following description: Third Generation Partnership Project ("3GPP"), 5$^{th}$ Generation ("5G"), QoS for NR V2X Communication ("5QI/PQI"), Authentication, Authorization, and Accounting ("AAA"), Positive-Acknowledgment ("ACK"), Aperiodic Channel State Information ("A-CSI"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Component Carrier ("CC"), Clear Channel Assessment ("CCA"), Common Control Channel ("CCCH"), Common Control Channel Service Data Unit ("CCCH SDU"), Control Channel Element ("CCE"), Cyclic Delay Diversity ("CDD"), Code Division Multiplexing ("CDM"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), CSI-RS Resource Index ("CRI"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Hybrid Automatic Repeat Request-Acknowledgement ("HARQ-ACK"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Low Noise Amplifier ("LNA"), Long Term Evolution ("LTE"), Multiple Access ("MA"), Medium Access Control ("MAC"), Medium Access Control Control Element ("MAC CE"), Multimedia Broadcast Multicast Services ("MBMS"), Maximum Bit Rate ("MBR"), Master Cell Group ("MCG"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Permissible Exposure ("MPE"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Frequency ("RF"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), SRS Resource Indicator ("SRI"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Slot Format Indicator ("SFI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Semi-persistent CSI ("SP-CSI"), Semi-persistent scheduling ("SPS"), Single Network Slice Selection Assistance Information ("5-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), SS/PBCH Block Resource Index ("SSBRI"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Transmission Configuration Indicator ("TCI"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, various beams may have a correspondence.

BRIEF SUMMARY

Methods for transmission skipping based on a beam correspondence are disclosed. Apparatuses and systems also perform the functions of the methods. One embodiment of a method includes receiving information corresponding to skipping uplink transmissions on at least one beam, at least one panel, or a combination thereof. In certain embodiments, the method includes determining whether a downlink transmission beam is blocked, a signal strength corresponding to the downlink transmission beam is less than a threshold signal strength, or a combination thereof. In some embodiments, the method includes, in response to the downlink transmission beam being blocked, the signal strength corresponding to the downlink transmission beam being less than the threshold signal strength, or a combination thereof, skipping one or more uplink transmissions on the at least one beam, the at least one panel, or the combination thereof that corresponds to the downlink transmission beam based on the information corresponding to skipping uplink transmissions.

One apparatus for transmission skipping based on a beam correspondence includes a receiver that receives information corresponding to skipping uplink transmissions on at least one beam, at least one panel, or a combination thereof. In various embodiments, the apparatus includes a processor that: determines whether a downlink transmission beam is blocked, a signal strength corresponding to the downlink transmission beam is less than a threshold signal strength, or a combination thereof; and, in response to the downlink transmission beam being blocked, the signal strength corresponding to the downlink transmission beam being less than the threshold signal strength, or a combination thereof, skips one or more uplink transmissions on the at least one beam, the at least one panel, or the combination thereof that corresponds to the downlink transmission beam based on the information corresponding to skipping uplink transmissions.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
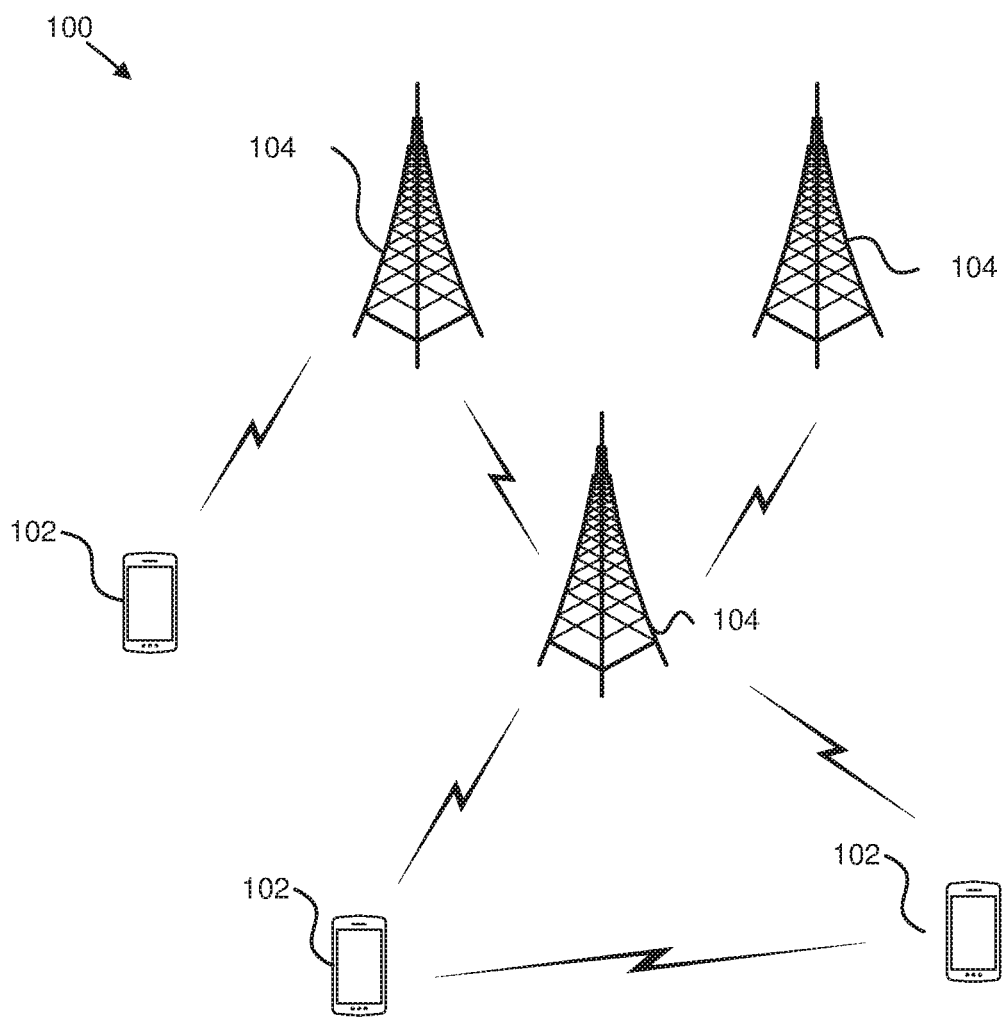
FIG. 1 is a schematic block diagram illustrating one embodiment of a wireless communication system for transmission skipping based on a beam correspondence.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmission skipping based on a beam correspondence. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 and/or a network unit 104 may receive information corresponding to skipping uplink transmissions on at least one beam, at least one panel, or a combination thereof. In certain embodiments, the remote unit 102 and/or the network unit 104 may determine whether a downlink transmission beam is blocked, a signal strength corresponding to the downlink transmission beam is less than a threshold signal strength, or a combination thereof. In some embodiments, the remote unit 102 and/or the network unit 104 may, in response to the downlink transmission beam being blocked, the signal strength corresponding to the downlink transmission beam being less than the threshold signal strength, or a combination thereof, skip one or more uplink transmissions on the at least one beam, the at least one panel, or the combination thereof that corresponds to the downlink transmission beam based on the information corresponding to skipping uplink transmissions. Accordingly, the remote unit 102 and/or the network unit 104 may be used for transmission skipping based on a beam correspondence.

Figure 2:
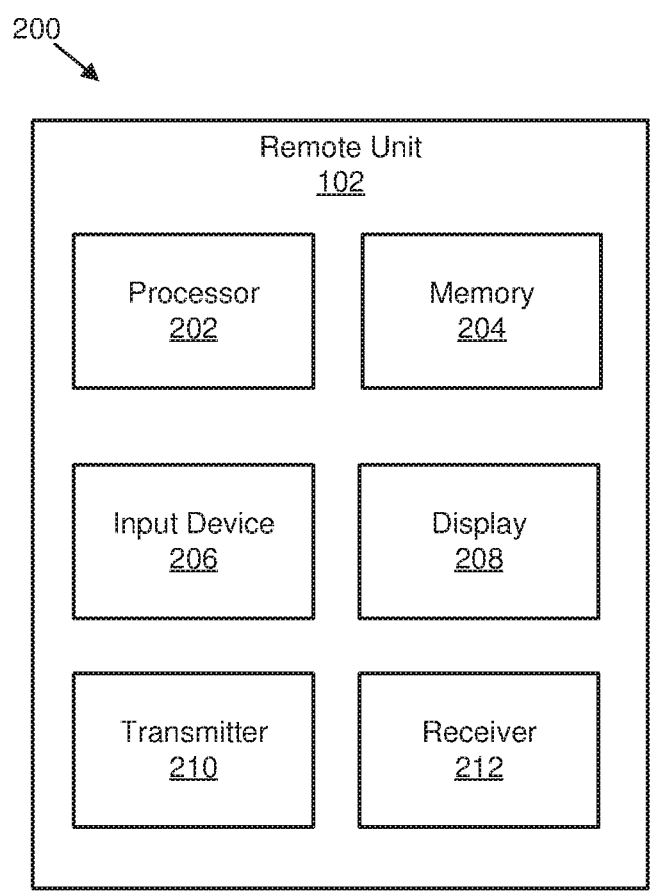
FIG. 2 is a schematic block diagram illustrating one embodiment of an apparatus that may be used for transmission skipping based on a beam correspondence.

FIG. 2 depicts one embodiment of an apparatus 200 that may be used for transmission skipping based on a beam correspondence. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the receiver 212 may receive information corresponding to skipping uplink transmissions on at least one beam, at least one panel, or a combination thereof. In various embodiments, the processor 202 may: determine whether a downlink transmission beam is blocked, a signal strength corresponding to the downlink transmission beam is less than a threshold signal strength, or a combination thereof and, in response to the downlink transmission beam being blocked, the signal strength corresponding to the downlink transmission beam being less than the threshold signal strength, or a combination thereof, skip one or more uplink transmissions on the at least one beam, the at least one panel, or the combination thereof that corresponds to the downlink transmission beam based on the information corresponding to skipping uplink transmissions.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
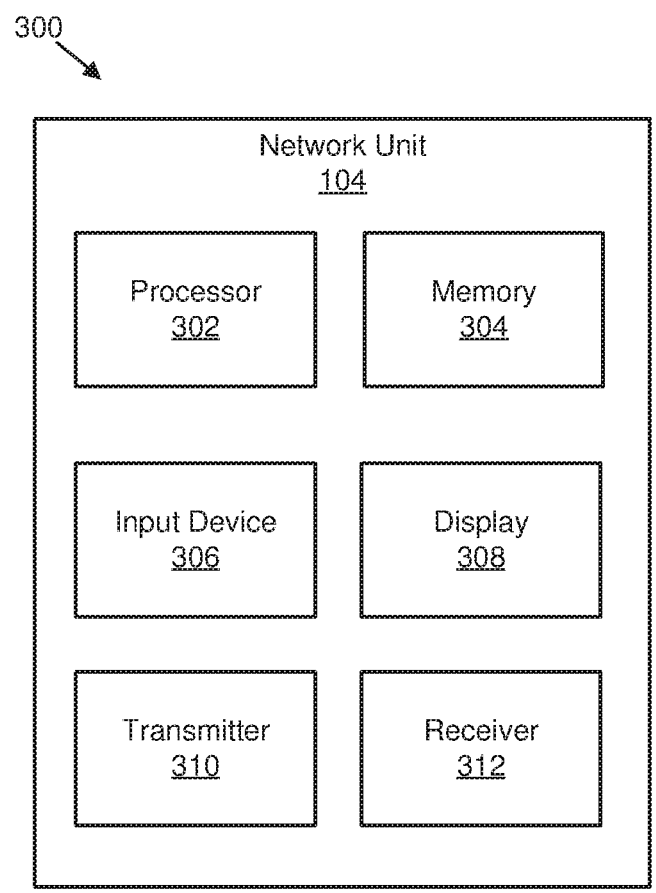
FIG. 3 is a schematic block diagram illustrating one embodiment of an apparatus that may be used for transmission skipping based on a beam correspondence.

FIG. 3 depicts one embodiment of an apparatus 300 that may be used for transmission skipping based on a beam correspondence. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive information corresponding to skipping uplink transmissions on at least one beam, at least one panel, or a combination thereof. In various embodiments, the processor 302 may: determine whether a downlink transmission beam is blocked, a signal strength corresponding to the downlink transmission beam is less than a threshold signal strength, or a combination thereof and, in response to the downlink transmission beam being blocked, the signal strength corresponding to the downlink transmission beam being less than the threshold signal strength, or a combination thereof, skip one or more uplink transmissions on the at least one beam, the at least one panel, or the combination thereof that corresponds to the downlink transmission beam based on the information corresponding to skipping uplink transmissions.

In various embodiments, there may be reliability issues with UL transmissions (e.g., PUCCH, PUCCH) in systems with multi-panel, TRP transmission, and/or TRP reception. In certain embodiments, such as for FR2 and higher frequencies, beam blockage may be an issue. In such embodiments, signals may become more susceptible to environmental factors and may experience a high probability of blockage. In some embodiments, UL repetitions and/or transmissions from different beams and/or panel of a UE may be performed based on a beam correspondence with DL beams and/or TRPs.

In certain embodiments, if a UE that uses default UL beams transmits 'K' PUSCH repetitions with 'N' different UL beams, and is configured by higher layer parameter PDCCH-Config that contains 'N' or greater than 'N' values of CORESETPoolIndex in ControlResourceSet on an active DL BWP of a scheduled cell, the UE determines a set of 'N' default UL beams for 'K' PUSCH repetitions based on a QCL assumption of a CORESET with a lowest CORESET ID within each of the lowest 'N' CORESETPoolIndex values on an active DL BWP of a scheduled cell. In such embodiments, the UE performs a PUSCH transmission of 'K' PUSCH repetitions based on a spatial relation with a reference to an RS with 'QCL-Type-D' corresponding to a QCL assumption of a CORESET with the lowest CORESET ID within each of the lowest 'N' CORESETPoolIndex values on the active DL BWP of the scheduled cell.

In some embodiments, if beam correspondence is configured and/or indicated to a UE and the UE is configured and/or expected to receive multiple transmissions and/or repetitions of PDCCH from multiple TRPs (e.g., multiple values of CORESETPoolIndex configured for multiple CORESETs) for scheduling and/or activating multiple transmissions and/or repetitions of PUSCH and/or PUCCH to multiple TRPs, then the UE may use a beam quality of the scheduling CORESETs for autonomously skipping UL transmissions on certain beams corresponding to certain TRPs. Depending up on the beam quality, the UE may autonomously skip transmissions on those certain beams with high blockage probability or low RSRP with respect to a certain threshold.

In various embodiments, beam correspondence may mean that the same spatial domain transmission filter is used for transmitting UL as used for receiving DL. In such embodiments, the beams for UL transmissions may have the same QCL assumption as, or a spatial relation with reference to, any of the DL RS with respect to "QCL-TypeD" and/or the same QCL assumption, or a spatial relation with reference to, the RS with respect to "QCL-TypeD" as the corresponding scheduling CORESETs.

In certain embodiments, beam correspondence may mean that each transmit port may be beamformed in a desirable direction but may not imply setting a phase across ports. In some embodiments, a UE may support beam correspondence with or without relying on UL beam sweeping.

In various embodiments, UL transmissions may include a skipping indication (e.g., data associated control signaling). The skipping indication may help the receiving device (e.g., gNB) reliably detect skipped UL transmissions and soft combine actual transmitted UL transmissions. The skipping indication may be a skipping indication bitmap with '1' indicating skip and '0' indicating no skip. The length of the bitmap may correspond to a number of activated, configured, scheduled, and/or indicated multiple transmissions and/or repetitions, or the bitmap length may be configured by higher layers (e.g., based on a maximum number of UL transmissions and/or repetitions). The skipping indication may indicate beams, transmission occasions, and/or repetition occasions of PUSCH and/or PUCCH that a UE autonomously skips corresponding to the activated, configured, scheduled, and/or indicated multiple transmissions and/or repetitions.

In one embodiment, the same skipping indication may be included in one or more actual UL transmissions and/or repetitions of multiple transmissions and/or repetitions. In such an embodiment, a UE may determine which UL transmissions of the one or more transmissions and/or repetitions it would skip before the beginning of the first UL transmissions of the one or more transmissions and/or repetitions. The receiving device may schedule other transmission (e.g., for the same UE or other UEs) on the resources that are indicated as being skipped.

In certain embodiments, a skipping indication may indicate the beams, transmission occasions, and/or repetition occasions of PUSCH and/or PUCCH that the UE autonomously skips up to (e.g., and not including) a current UL transmission occasion. In such embodiments, the skipping indication and/or a length of a skipping indication bitmap (e.g., based on a number of UL transmission occasions up to and not including the current UL transmission occasion) may be different on each actual UL transmission of multiple transmissions and/or repetitions.

In some embodiments, a skipping indication may be encoded separately from UL data (e.g., PUSCH, PUCCH) or associated transport blocks on an UL transmission occasion. In various embodiments, a skipping indication may be transmitted near (e.g., on or adjacent to) a RS for an UL transmission occasion. In certain embodiments, a skipping indication may be transmitted near an end (e.g., last symbol) of an UL transmission occasion. A number of REs used for a skipping indication may be based on an MCS, an MCR, a PUCCH format, or a skipping information offset (e.g., beta offset). The skipping information offset (e.g., beta offset) indicator may be semi-static or dynamic and may be indicated on corresponding DCI (e.g., 1 and/or 2 bit indication indicating a 2 and/or 4 bit offset index provided by higher layers).

In various embodiments, whether a UE may perform autonomous skipping of UL transmission and/or repetition of multiple transmissions and/or repetitions to multiple TRPs may be configured by higher layers (e.g., MAC CE, RRC). The presence of and/or including a skipping indicator in an UL transmission may be configured by higher layers. The UE may be configured with a maximum number (or fraction) of UL transmissions that the UE can autonomously skip. In one embodiment, a UE may skip an UL transmission occasion that may result in the UE being power limited (e.g., available UL transmit power is less than that needed for the UL transmission occasion). In certain embodiments, a UE may skip an UL transmission repetition corresponding to a higher MCR and/or spectral efficiency relative to another transmission repetition with a lower MCR and/or spectral efficiency for the same transport block. For example, if deciding whether to skip either a first UL transmission repetition or a second UL transmission repetition, the UE may make the decision based on the MCR and/or spectral efficiency. In such an example, the first UL transmission repetition and the second UL transmission repetition may both meet the criteria for skipping based on some metric (e.g., beam quality, RSRP, RSRQ). Moreover, the first UL transmission repetition and the second UL transmission repetition may overlap (e.g., partial overlap of time-frequency resources, full overlap of time-frequency resources).

In some embodiments, a skipping indication may be transmitted on a separate control channel (e.g., a skipping indication for multiple PUSCH transmissions and/or repetitions may be indicated on a PUCCH).

As may be appreciated, various embodiments described herein may facilitate inhibiting blockage of UL transmissions on more or more TRPs at very low-latency and without additional signaling overhead.

In certain embodiments, if a UE is configured and/or indicated to transmit 'K' PUSCH and/or PUCCH repetitions with 'N' different UL beams corresponding to 'N' QCL assumptions pertaining to 'Type-D' or spatial relation and if each of the assumptions is determined based on a QCL of a CORESET with a lowest CORESET ID within each of a lowest 'N' CORESETPoolIndex values (e.g., N lowest indexed TRPs) on an active DL BWP of a scheduled cell, then the UE may autonomously skip transmission on one or more default beams towards one or more TRPs based on a beam quality of corresponding scheduling CORESETs. In one embodiment, a beam quality may be determined based on a QCL 'Type-D' DL RS of a TCI state of a scheduling CORESET. The QCL 'Type-D' DL RS may be a beam management CSI-RS or an SSB.

In various embodiments, a PDCCH transmission that is scheduling and/or activating PUSCH and/or PUCCH repetitions may be repeated from 'N' TRPs (e.g., CORESETs with 'N' values of CORESETPoolIndex) for better reliability, but a UE receiving the repeated PDCCH transmission may receive the PDCCH transmission from less than 'N' TRPs. In such embodiments, the UE may skip the repetition on the beams corresponding to the TRPs (e.g., CORESETPoolIndex values) for which the repeated PDCCH transmission was not received.

In some embodiments, a PDCCH transmission that is scheduling and/or activating PUSCH and/or PUCCH repetitions on partially overlapping and/or fully overlapping time-frequency resources may be repeated from 'N' TRPs (e.g., CORESETs with 'N' values of CORESETPoolIndex) for better reliability, but a UE receiving the repeated PDCCH transmission may receive the PDCCH transmission from less than 'N' TRPs. In such embodiments, the UE may skip the repetition on the beams corresponding to the TRPs (e.g., CORESETPoolIndex values) for which the repeated PDCCH was not received, and the UE may transmit the remaining repetitions with increased power (e.g., greater than a maximum allowed transmit power per beam and/or panel if all scheduled beams and/or panels at the UE transmit at the same time). In one embodiment, a UE-specific open-loop power control parameter, Po, may be adjusted for actual repetition if at least one repetition is skipped. The adjustment may be an offset term configured by higher layers, indicated in DCI, signaled in the DCI, and/or determined based on a number of skip repetitions (e.g., relative to a total number of repetitions).

In certain embodiments, if a UE is configured (or indicated) to monitor repeated PDCCH transmissions scheduling and/or activating PUSCH and/or PUCCH repetitions on 'N' CORESETs with 'N' different TCI states but does not detect at least one PDCCH transmission of the repeated PDCCH transmissions, and if the UE receives scheduling and/or activation information (e.g. via an SRS resource indicator field in DCI) to transmit at least one of the PUSCH and/or PUCCH repetitions with an UL beam corresponding to a QCL assumption of a CORESET for which the UE does not detect the at least one PDCCH transmission, the UE may skip transmitting the at least one of the PUSCH and/or PUCCH repetitions with the UL beam. In such embodiments, the indicated and/or scheduled UL beam (e.g., via SRS resource indicator) for the skipped at least one of the PUSCH and/or PUCCH repetitions may have a spatialRelationInfo configuration indicating a spatial relation between the UL beam and a QCL 'Type-D' DL RS of a TCI state of a CORESET for which the UE does not detect the at least one PDCCH transmission.

In various embodiments, if a UE is configured and/or indicated to transmit 'K' PUSCH and/or PUCCH repetitions with 'N' different UL beams corresponding to 'N' QCL assumptions pertaining to 'Type-D' or spatial relation, and if each of the assumptions is determined based of a QCL of a CORESET with a lowest CORESET ID within each of a lowest 'N' CORESETPoolIndex values (e.g., N lowest indexed TRPs) on an active DL BWP of a scheduled cell, then the UE may autonomously skip transmissions on one or more default beams towards one or more TRPs based on a beam quality of respective scheduling CORESETs. In such embodiments, the UE may use a second default beam associated with a second lowest CORESET ID (e.g., if available) of the corresponding CORESETPoolIndex if a first default beam quality is measured to be below a certain threshold. A similar procedure may be performed for all CORESETPoolIndex values corresponding to scheduled repetitions. If no second default beam is available for a given CORESETPoolIndex value, then the UL transmission may be skipped.

In some embodiments, a PDCCH transmission scheduling and/or activating PUSCH and/or PUCCH repetitions may be repeated from 'N' TRPs (e.g., CORESETs with 'N' values of CORESETPoolIndex) for better reliability, but a UE may receive PDCCH transmissions from less than 'N' TRPs. In such embodiments, the UE may use a beam corresponding to a second lowest CORESET ID (e.g., if available) with a same CORESETPoolIndex value for repetition on the beams corresponding to the TRPs (e.g., CORESETPoolIndex values) in which the PDCCH transmissions were not received.

If no second default beam is available for a given CORESETPoolIndex value, then the UL repetition may be skipped.

In certain embodiments, a PDCCH transmission scheduling and/or activating PUSCH and/or PUCCH repetitions is repeated from 'N' TRPs (e.g., CORESETs with 'N' values of CORESETPoolIndex) for better reliability, but a UE may receive PDCCH transmissions from less than 'N' TRPs. In such embodiments, the UE may use a beam corresponding to a second lowest CORESET ID (e.g., if available) with a same CORESETPoolIndex value for repetition on the beams corresponding to the TRPs (e.g., CORESETPoolIndex values) in which the PDCCH transmissions were not received. If no second default beam is available for that CORESETPoolIndex value, then the corresponding UL repetition is skipped and the UE may transmit the remaining repetitions with increased power (e.g., which is greater than a maximum allowed transmit power per beam and/or panel if all the scheduled beams and/or panels at the UE transmit at the same time).

In various embodiments, a network may configure and/or indicate a threshold in terms of a number of symbols from a last received symbol scheduling PDCCH transmissions. The threshold may be used to determine whether skipping transmission on a beam with a low received signal strength and/or a high blocking probability is applied for a PUSCH and/or PUCCH transmission. If a PUSCH and/or PUCCH transmission is scheduled and/or configured for transmission within the threshold, then the transmission may be skipped or transmitted from another beam. Otherwise, if the transmission is scheduled after the threshold, then the transmission is not skipped. The configuration of the number of symbols may be proportional to a numerology.

In some embodiments, if multiple transmissions and/or repetitions on PUSCH and/or PUCCH are scheduled on a certain beam in a TDM manner, then, depending on a threshold, the transmissions and/or repetitions scheduled within the threshold may be skipped and the transmissions and/or repetitions scheduled outside the threshold may be transmitted.

Figure 4:
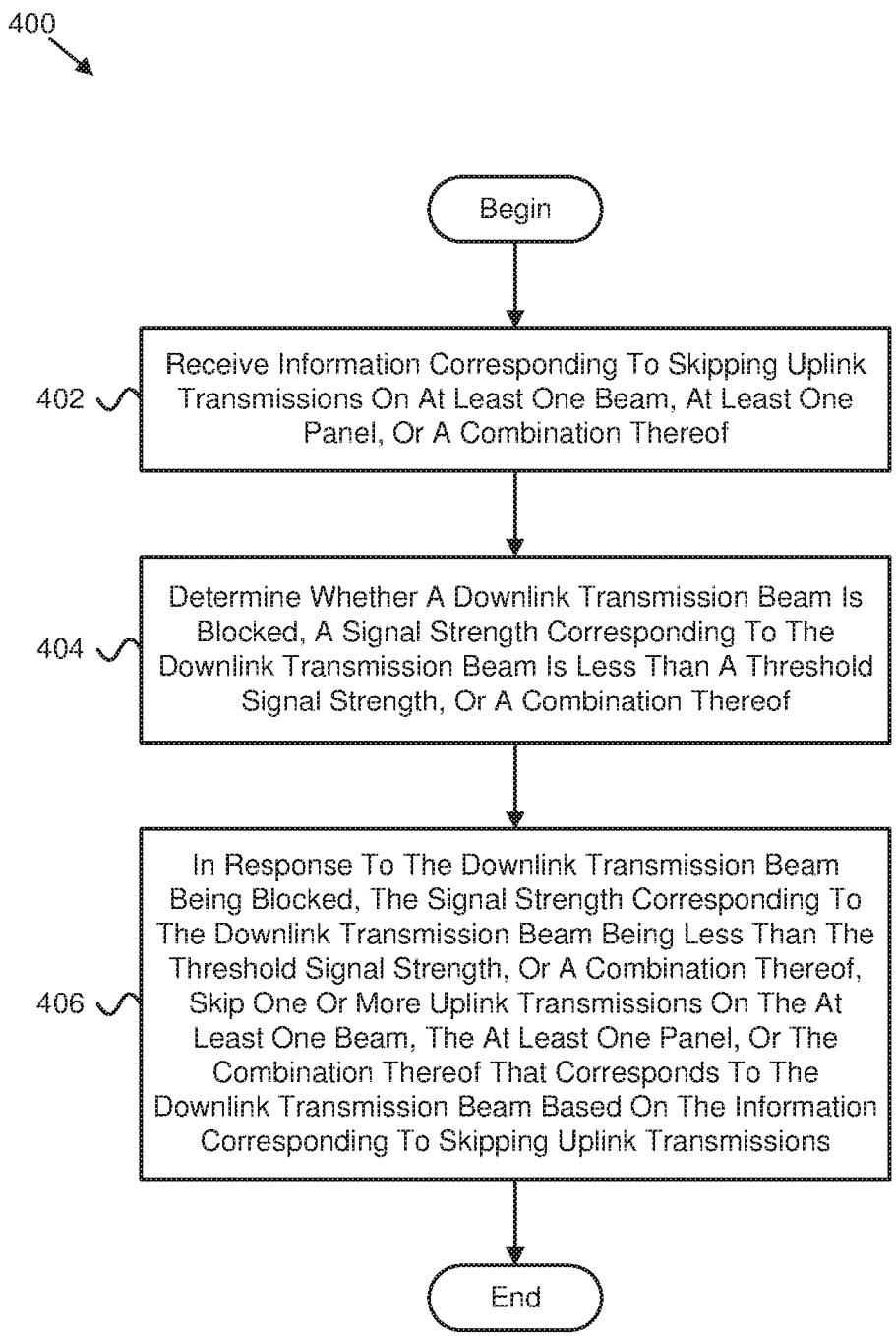
FIG. 4 is a flow chart diagram illustrating one embodiment of a method for transmission skipping based on a beam correspondence.

FIG. 4 is a flow chart diagram illustrating one embodiment of a method 400 for transmission skipping based on a beam correspondence. In some embodiments, the method 400 is performed by an apparatus, such as the remote unit 102 and/or the network unit 104. In certain embodiments, the method 400 may be performed by a processor executing program code, for example, a microcontroller, a microprocessor, a CPU, a GPU, an auxiliary processing unit, a FPGA, or the like.

In various embodiments, the method 400 includes receiving 402 information corresponding to skipping uplink transmissions on at least one beam, at least one panel, or a combination thereof. In certain embodiments, the method 400 includes determining 404 whether a downlink transmission beam is blocked, a signal strength corresponding to the downlink transmission beam is less than a threshold signal strength, or a combination thereof. In some embodiments, the method 400 includes, in response to the downlink transmission beam being blocked, the signal strength corresponding to the downlink transmission beam being less than the threshold signal strength, or a combination thereof, skipping 406 one or more uplink transmissions on the at least one beam, the at least one panel, or the combination thereof that corresponds to the downlink transmission beam based on the information corresponding to skipping uplink transmissions.

In certain embodiments, the information corresponding to skipping uplink transmission comprises a timing threshold configuration, an indication to perform skipping, or a combination thereof. In some embodiments, the downlink transmission beam corresponds to at least one expected physical downlink control channel transmission. In various embodiments, the at least one expected physical downlink control channel transmission comprises a plurality of expected physical downlink control channel transmissions received on multiple downlink beams from at least one transmission and reception point.

In one embodiment, skipping the one or more uplink transmissions on the at least one beam, the at least one panel, or the combination thereof that corresponds to the downlink transmission beam comprises skipping the one or more uplink transmissions on a first beam corresponding to a transmission and reception point, and, in response to skipping the one or more uplink transmission on the first beam corresponding to the transmission and reception point, autonomously switching to a second beam corresponding to the transmission and reception point and transmitting the one or more uplink transmissions on the second beam. In certain embodiments, the first beam and the second beam are part of a CORESETPoolIndex.

In some embodiments, skipping the one or more uplink transmissions on the at least one beam, the at least one panel, or the combination thereof that corresponds to the downlink transmission beam comprises skipping the one or more uplink transmissions on a first beam corresponding to a transmission and reception point, and, in response to skipping the one or more uplink transmission on the first beam corresponding to the transmission and reception point and in response to the one or more uplink transmissions being configured for concurrent transmission on the first beam and on a second beam, increasing a transmission power corresponding to transmission of the one or more uplink transmissions by the second beam.

In various embodiments, skipping the one or more uplink transmissions on the at least one beam, the at least one panel, or the combination thereof that corresponds to the downlink transmission beam comprises skipping a first uplink transmission of the one or more uplink transmissions and transmitting a second uplink transmission of the one or more uplink transmissions. In one embodiment, skipping the one or more uplink transmissions on the at least one beam, the at least one panel, or the combination thereof that corresponds to the downlink transmission beam comprises skipping a first portion of the one or more uplink transmissions that occur within a threshold time period and not skipping a second portion of the one or more uplink transmissions that occur outside of the threshold time period.

In one embodiment, a method comprises: receiving information corresponding to skipping uplink transmissions on at least one beam, at least one panel, or a combination thereof; determining whether a downlink transmission beam is blocked, a signal strength corresponding to the downlink transmission beam is less than a threshold signal strength, or a combination thereof; and in response to the downlink transmission beam being blocked, the signal strength corresponding to the downlink transmission beam being less than the threshold signal strength, or a combination thereof, skipping one or more uplink transmissions on the at least one beam, the at least one panel, or the combination thereof that corresponds to the downlink transmission beam based on the information corresponding to skipping uplink transmissions.

In certain embodiments, the information corresponding to skipping uplink transmission comprises a timing threshold configuration, an indication to perform skipping, or a combination thereof.

In some embodiments, the downlink transmission beam corresponds to at least one expected physical downlink control channel transmission.

In various embodiments, the at least one expected physical downlink control channel transmission comprises a plurality of expected physical downlink control channel transmissions received on multiple downlink beams from at least one transmission and reception point.

In one embodiment, skipping the one or more uplink transmissions on the at least one beam, the at least one panel, or the combination thereof that corresponds to the downlink transmission beam comprises skipping the one or more uplink transmissions on a first beam corresponding to a transmission and reception point, and, in response to skipping the one or more uplink transmission on the first beam corresponding to the transmission and reception point, autonomously switching to a second beam corresponding to the transmission and reception point and transmitting the one or more uplink transmissions on the second beam.

In certain embodiments, the first beam and the second beam are part of a CORESETPoolIndex.

In some embodiments, skipping the one or more uplink transmissions on the at least one beam, the at least one panel, or the combination thereof that corresponds to the downlink transmission beam comprises skipping the one or more uplink transmissions on a first beam corresponding to a transmission and reception point, and, in response to skipping the one or more uplink transmission on the first beam corresponding to the transmission and reception point and in response to the one or more uplink transmissions being configured for concurrent transmission on the first beam and on a second beam, increasing a transmission power corresponding to transmission of the one or more uplink transmissions by the second beam.

In various embodiments, skipping the one or more uplink transmissions on the at least one beam, the at least one panel, or the combination thereof that corresponds to the downlink transmission beam comprises skipping a first uplink transmission of the one or more uplink transmissions and transmitting a second uplink transmission of the one or more uplink transmissions.

In one embodiment, skipping the one or more uplink transmissions on the at least one beam, the at least one panel, or the combination thereof that corresponds to the downlink transmission beam comprises skipping a first portion of the one or more uplink transmissions that occur within a threshold time period and not skipping a second portion of the one or more uplink transmissions that occur outside of the threshold time period.

In one embodiment, an apparatus comprises: a receiver that receives information corresponding to skipping uplink transmissions on at least one beam, at least one panel, or a combination thereof; and a processor that: determines whether a downlink transmission beam is blocked, a signal strength corresponding to the downlink transmission beam is less than a threshold signal strength, or a combination thereof; and in response to the downlink transmission beam being blocked, the signal strength corresponding to the downlink transmission beam being less than the threshold signal strength, or a combination thereof, skips one or more uplink transmissions on the at least one beam, the at least one panel, or the combination thereof that corresponds to the downlink transmission beam based on the information corresponding to skipping uplink transmissions.

In certain embodiments, the information corresponding to skipping uplink transmission comprises a timing threshold configuration, an indication to perform skipping, or a combination thereof.

In some embodiments, the downlink transmission beam corresponds to at least one expected physical downlink control channel transmission.

In various embodiments, the at least one expected physical downlink control channel transmission comprises a plurality of expected physical downlink control channel transmissions received on multiple downlink beams from at least one transmission and reception point.

In one embodiment, the processor skipping the one or more uplink transmissions on the at least one beam, the at least one panel, or the combination thereof that corresponds to the downlink transmission beam comprises the processor skipping the one or more uplink transmissions on a first beam corresponding to a transmission and reception point, and, in response to skipping the one or more uplink transmission on the first beam corresponding to the transmission and reception point, autonomously switching to a second beam corresponding to the transmission and reception point and transmitting the one or more uplink transmissions on the second beam.

In certain embodiments, the first beam and the second beam are part of a CORESETPoolIndex.

In some embodiments, the processor skipping the one or more uplink transmissions on the at least one beam, the at least one panel, or the combination thereof that corresponds to the downlink transmission beam comprises the processor skipping the one or more uplink transmissions on a first beam corresponding to a transmission and reception point, and, in response to skipping the one or more uplink transmission on the first beam corresponding to the transmission and reception point and in response to the one or more uplink transmissions being configured for concurrent transmission on the first beam and on a second beam, increasing a transmission power corresponding to transmission of the one or more uplink transmissions by the second beam.

In various embodiments, the processor skipping the one or more uplink transmissions on the at least one beam, the at least one panel, or the combination thereof that corresponds to the downlink transmission beam comprises the processor skipping a first uplink transmission of the one or more uplink transmissions and transmitting a second uplink transmission of the one or more uplink transmissions.

In one embodiment, the processor skipping the one or more uplink transmissions on the at least one beam, the at least one panel, or the combination thereof that corresponds to the downlink transmission beam comprises the processor skipping a first portion of the one or more uplink transmissions that occur within a threshold time period and not skipping a second portion of the one or more uplink transmissions that occur outside of the threshold time period.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for wireless communication by a user equipment (UE), the method comprising:
receiving information that indicates a first threshold used to determine whether to skip uplink transmission on one or more of at least one beam or at least one panel, wherein the first threshold is a number of symbols from a last received symbol of physical downlink control channel (PDCCH) transmissions that schedule the uplink transmission;

determining one or more of whether a downlink transmission beam is blocked or, a signal strength corresponding to the downlink transmission beam is less than a threshold signal strength; and in response to one or more of the downlink transmission beam being blocked or the signal strength corresponding to the downlink transmission beam being less than the threshold signal strength and based on the first threshold used to determine whether to skip uplink transmission, skipping one or more uplink transmissions on one or more of the at least one beam or the at least one panel that corresponds to the downlink transmission beam.

2. The method of claim 1, wherein the information comprises a timing threshold configuration, or an indication to perform skipping, or both.

3. The method of claim 1, wherein the downlink transmission beam corresponds to at least one expected PDCCH transmission.

4. The method of claim 3, wherein the at least one expected PDCCH transmission comprises a plurality of expected PDCCH transmissions received on multiple downlink beams from at least one transmission and reception point (TRP).

5. The method of claim 1, wherein skipping the one or more uplink transmissions on the one or more of the at least one beam or the at least one panel that corresponds to the downlink transmission beam comprises skipping the one or more uplink transmissions on a first beam corresponding to a transmission and reception point (TRP), and, in response to skipping the one or more uplink transmission on the first beam corresponding to the TRP, autonomously switching to a second beam corresponding to the TRP and transmitting the one or more uplink transmissions on the second beam.

6. The method of claim 5, wherein the first beam and the second beam are part of a CORESETPoolIndex.

7. The method of claim 1, wherein skipping the one or more uplink transmissions on the one or more of the at least one beam or the at least one panel that corresponds to the downlink transmission beam comprises skipping the one or more uplink transmissions on a first beam corresponding to a transmission and reception point (TRP), and, in response to skipping the one or more uplink transmission on the first beam corresponding to the TRP and in response to the one or more uplink transmissions being configured for concurrent transmission on the first beam and on a second beam, increasing a transmission power corresponding to transmission of the one or more uplink transmissions by the second beam.

8. The method of claim 1, wherein skipping the one or more uplink transmissions on the one or more of the at least one beam or the at least one panel that corresponds to the downlink transmission beam comprises skipping a first uplink transmission of the one or more uplink transmissions and transmitting a second uplink transmission of the one or more uplink transmissions.

9. The method of claim 1, wherein skipping the one or more uplink transmissions on the one or more of the at least one beam or the at least one panel that corresponds to the downlink transmission beam comprises skipping a first portion of the one or more uplink transmissions that occur within a threshold time period and not skipping a second portion of the one or more uplink transmissions that occur outside of the threshold time period.

10. A user equipment (UE), comprising:
at least one memory; and
at least one processor coupled with the at least one memory and configured to cause the UE to:
receive information that indicates a first threshold used to determine whether to skip uplink transmission on one or more of at least one beam or at least one panel, wherein the first threshold is a number of symbols from a last received symbol of physical downlink control channel (PDCCH) transmissions that schedule the uplink transmission;
determine one or more of whether a downlink transmission beam is blocked or a signal strength corresponding to the downlink transmission beam is less than a threshold signal strength; and
in response to one or more of the downlink transmission beam being blocked or the signal strength corresponding to the downlink transmission beam being less than the threshold signal strength and based on the first threshold used to determine whether to skip uplink transmission,
skip one or more uplink transmissions on one or more of the at least one beam or the at least one panel that corresponds to the downlink transmission beam.

11. The UE of claim 10, wherein the information comprises a timing threshold configuration, or an indication to perform skipping, or both.

12. The UE of claim 10, wherein the downlink transmission beam corresponds to at least one expected PDCCH transmission.

13. The UE of claim 12, wherein the at least one expected PDCCH transmission comprises a plurality of expected PDCCH transmissions received on multiple downlink beams from at least one transmission and reception point (TRP).

14. The UE of claim 10, wherein the at least one processor is configured to cause the UE to skip the one or more uplink transmissions on a first beam corresponding to a transmission and reception point (TRP), and, in response to skipping the one or more uplink transmission on the first beam corresponding to the TRP, autonomously switch to a second beam corresponding to the TRP and transmit the one or more uplink transmissions on the second beam.

15. The UE of claim 14, wherein the first beam and the second beam are part of a CORESETPoolIndex.

16. The UE of claim 10, wherein the at least one processor is configured to cause the UE to skip the one or more uplink transmissions on a first beam corresponding to a transmission and reception point (TRP), and, in response to skipping the one or more uplink transmission on the first beam corresponding to the TRP and in response to the one or more uplink transmissions being configured for concurrent transmission on the first beam and on a second beam, increase a transmission power corresponding to transmission of the one or more uplink transmissions by the second beam.

17. The UE of claim 10, wherein the at least one processor is configured to cause the UE to skip a first uplink transmission of the one or more uplink transmissions and transmitting a second uplink transmission of the one or more uplink transmissions.

18. The UE of claim 10, wherein the at least one processor is configured to cause the UE to skip a first portion of the one or more uplink transmissions that occur within a threshold time period and not skip a second portion of the one or more uplink transmissions that occur outside of the threshold time period.

19. A method for wireless communication by a base station, the method comprising:
- transmit information that indicates a first threshold used to determine whether to skip uplink transmission on one or more of at least one beam or at least one panel, wherein the first threshold is a number of symbols from a last received symbol of physical downlink control channel (PDCCH) transmissions that schedule the uplink transmission, wherein one or more of a downlink transmission beam is blocked or a signal strength corresponding to the downlink transmission beam is less than a threshold signal strength, and wherein one or more uplink transmissions is skipped:
  - in response to one or more of the downlink transmission beam being blocked or the signal strength corresponding to the downlink transmission beam being less than the threshold signal strength; and
  - based on the first threshold used to determine whether to skip uplink transmission.

20. The base station of claim 19, wherein the information comprises one or more of a timing threshold configuration or an indication to perform skipping.

* * * * *